Patented June 17, 1941

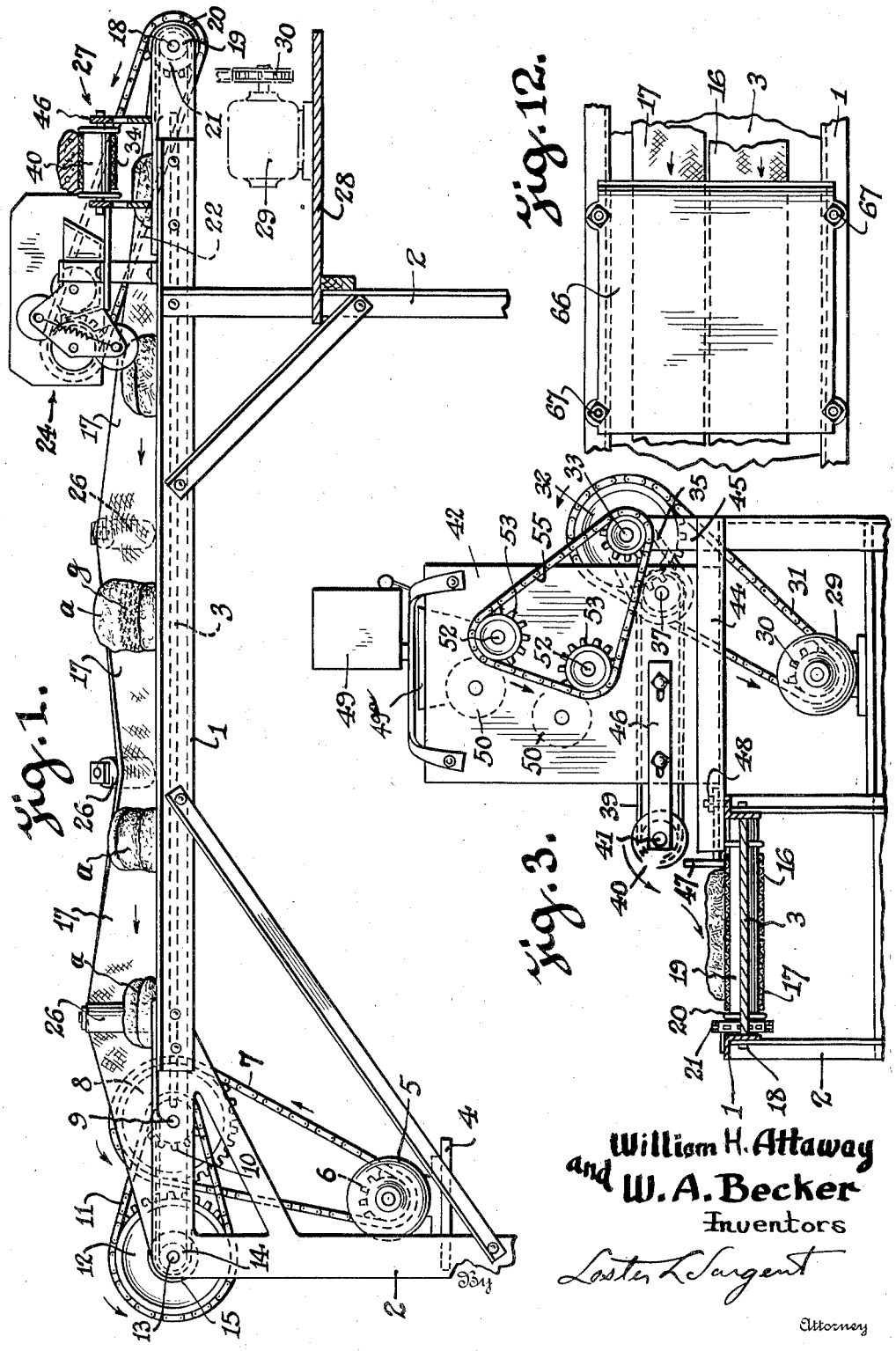

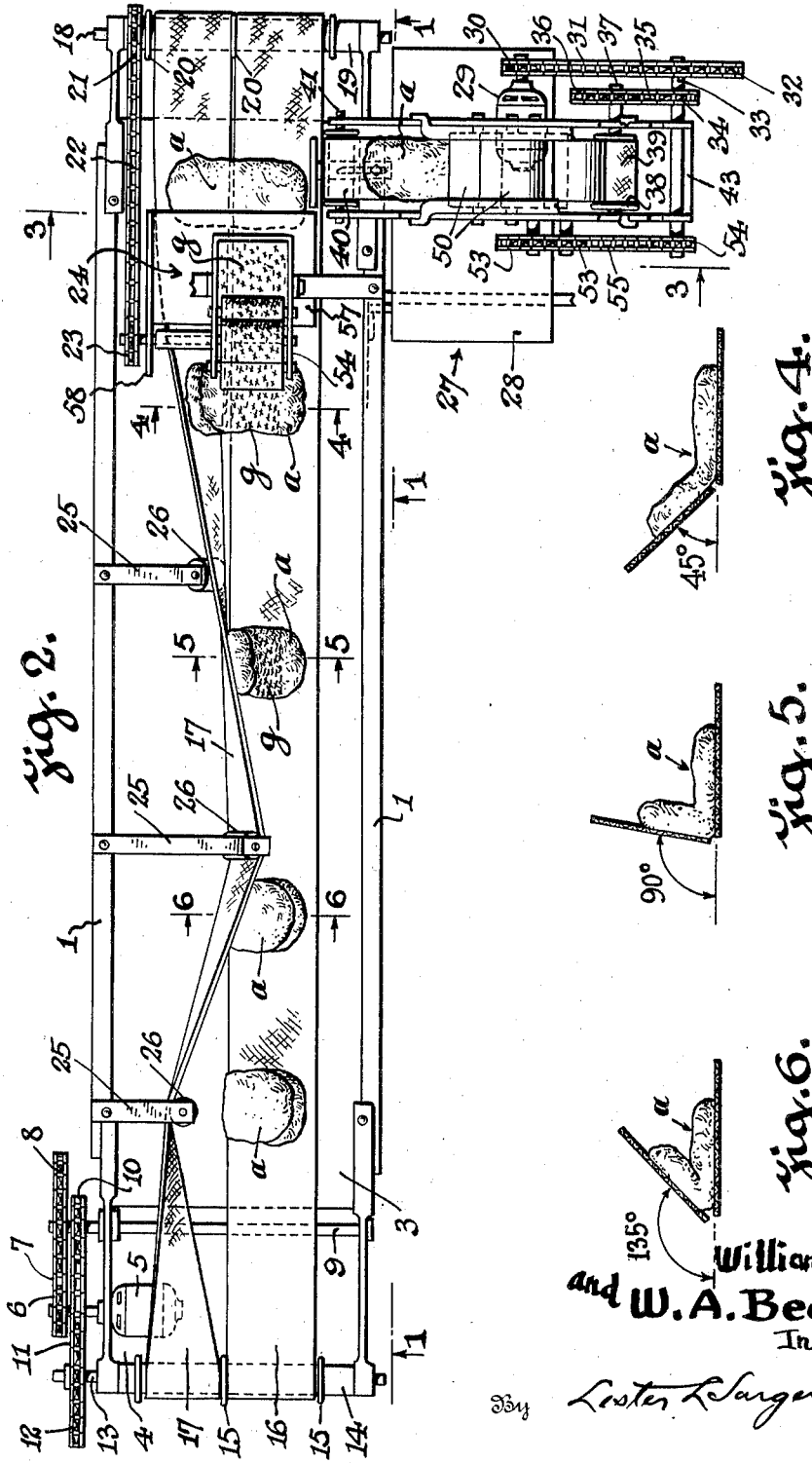

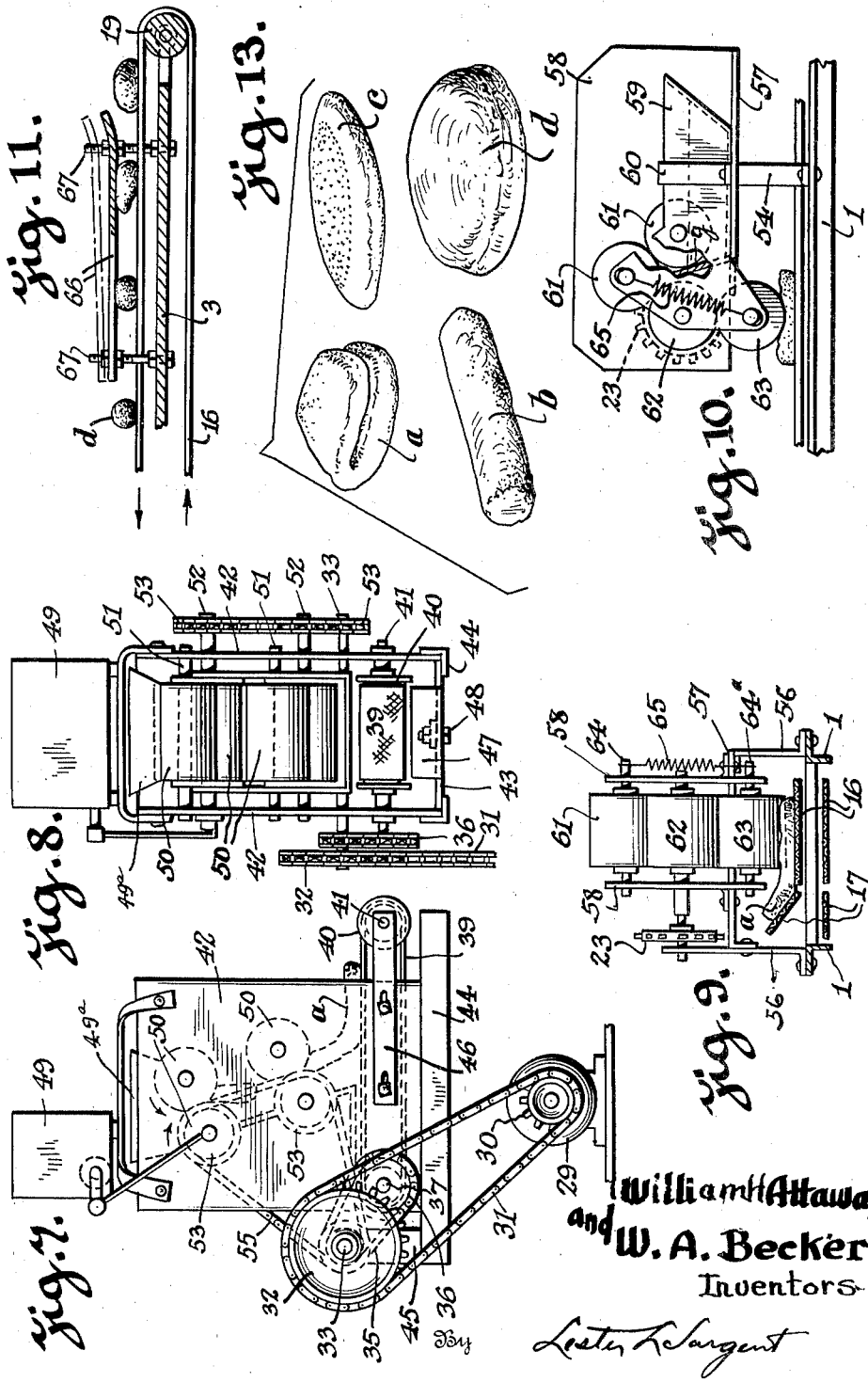

2,246,477

UNITED STATES PATENT OFFICE 2,246,477

MACHINE FOR FORMING AND FOLDING POCKETBOOK ROLLS, WEINER ROLLS, AND THE LIKE

William H. Attaway, Spartanburg, S. C., and Walter A. Becker, Charlotte, N. C.

Application January 17, 1940, Serial No. 314,322

2 Claims. (Cl. 107—9)

The object of our invention is to provide a novel and efficient machine for forming and rolling pocketbook rolls, weiner rolls and the like.

The purpose of this machine is two fold: first, to do the work automatically and uniformly by machine and thereby speed up production; second, to eliminate the handling of dough by operators personally in forming and kneading the dough and thereby effecting a new improvement from a health standpoint. We attain these and other objects of our invention by the mechanism illustrated in the accompanying drawings in which—

Figure 1 is a side elevation of the invention in operation, an end portion of it shown in section being on line 1—1 of Fig. 2;

Fig. 2 is a top plan view of the invention in operation;

Fig. 3 is a vertical section on line 3—3 of Fig. 2;

Fig. 4 is a detailed vertical section on line 4—4 of Fig. 2;

Fig. 5 is a detail vertical section on line 5—5 of Fig. 2;

Fig. 6 is a detail vertical section on line 6—6 of Fig. 2;

Fig. 7 is a right side elevational view of a dough former;

Fig. 8 is an end elevation of the delivery end of the dough former;

Fig. 9 is a detail end elevation of the exit end of the grease applicator;

Fig. 10 is a detail side elevation of the grease applicator, a portion of member 59 being broken away;

Fig. 11 is a detail view partly in section and partly in side elevation of the mechanism for forming the rolled dough forms;

Fig. 12 is a plan view of the mechanism shown in Fig. 11, and—

Fig. 13 is a perspective view of examples of folded and rolled dough forms.

Like characters of reference designate like parts in each of the several views.

Referring to the drawings, we provide a main frame 1 mounted on the legs or supports 2 and carrying a bed plate 3. The supports at one end of the frame carry a table 4 on which is mounted a motor 5 which drives the small sprocket 6, which drives the chain 7, which in turn drives the larger sprocket 8 mounted on shaft 9, which shaft also carries a small sprocket 10. The sprocket 10 drives chain 11, which drives the large sprocket 12, which sprocket is mounted on shaft 13. Also mounted on shaft 13 is belt roller 14 which operates the carrying belt 16 and folding belt 17, these belts being spaced by the guard 15 at the other end of the main frame. The belts 16 and 17 are mounted on the roller 19 carried by shaft 18, these belts being spaced by the guard 20, as shown in Fig. 2. Mounted on one end of roller 19 is a small sprocket 21 which turns with the belt roller 19 and drives chain 22, which in turn drives sprocket 23 and actuates the greasing device 24, as shown in Fig. 1, and which will be more fully described hereinafter.

As shown in Fig. 2, we provide a series of brackets 25 carrying rollers 26 disposed at different angles and engaging the dough forming belt 17. The formed dough is delivered from a suitable dough forming unit 27 to the end of the belts 16 and 17 nearest the roller 19. At this same end of the machine we provide a platform 28, as shown in Fig. 1 on which is mounted a motor 29 which drives the sprocket 30, which sprocket drives the chain 31, as shown in Fig. 2. Chain 31 operates large sprocket 32, shaft 33 and small sprocket 34 which also is mounted on shaft 33. Small sprocket 34 drives chain 35, large sprocket 36 and shaft 37 on which the sprocket 36 is mounted. Shaft 37 carries a driven roller 38, which in turn carries belt 39. As shown in Fig. 3, belt 39 also passes over the return roller 40 on shaft 41, the shaft 41 being supported at each end by arms 46 which are adjustably mounted on the side plates 42.

A frame 44 is provided which supports the side plates 42 and also supports the bottom plate 43. Also attached to the frame is a support or bracket 45 which carries the shaft 33 on which the driven sprocket 32 is mounted. As shown in Fig. 3 and Fig. 8, we provide an adjusting plate or device 7 which is adjustably secured to the frame by the bolt and nut 48.

Mounted on the dough forming apparatus is a flour dusting hopper 49, as shown in Fig. 7. The dough forming apparatus has spaced pairs of rollers 50. One roller of each pair is mounted on the idle shaft 51 while the other roller of each pair is mounted on the driven shaft 52, which shaft also carries driven sprockets 53, which are driven by chain 55 from the driving sprocket 54, as shown in Fig. 2, which sprocket 54 is mounted on shaft 33 and driven by that shaft.

As shown in Figs. 9 and 10, the greasing apparatus unit comprises a frame 56 carrying the base plate 57 and having guard plates 58 within which is mounted a grease pot or pan 59 supported by the holding strap 60. The lower lifting roller 61 is partly submerged in the grease in the pan, as shown in Fig. 10, and the upper roller 61 contacts the transferring roller 62, which in turn contacts the applicator roller 63 which applies the grease to the formed dough a, as it passes beneath that roller traveling on belts 16 and 17. The rollers are held in operative contact by the spring 65 which engages the respective roller shafts 64 and 64a.

Referring to Fig. 11, we provide means for changing the shape of the formed dough from a relatively flat shape a to a round shape d by means of an adjustable board 66 disposed above the belt 16 and adjustably supported by the spaced adjusting means 67, the board 66 being curved upwardly at its bent end and being supported in a slightly lower position at its rear end to permit the dough as it rolls along to emerge in a round, oblong shape, as shown, Fig. 13b.

Referring to Fig. 13, there are illustrated several forms of baked products that may be made with the machine—a, indicating the pocketbook formed roll, or the Parker House roll; b, indicating the stick roll; c, the weiner roll and d, the round roll. The letter g, as it appears on Figs. 2 and 10 designates grease.

In operation, the dough is fed from the hopper 49a, as shown in Fig. 7, through the pairs of forming rollers 50 to the endless belt 40, which is positioned in a relatively higher plane than the belts 16 and 17, as shown in Figs. 1 and 3, and which delivers the formed dough a to one end of the endless belt 16 and 17, as indicated by the arrows in Fig. 3. In advance of the greasing apparatus unit 24, grease is transferred from pan 59 by lifting rollers 61 to the transfer roller 62 and the applicator roller 63 which greases about one-half of one side of the formed dough a. As the endless belts 16 and 17 travel toward the other end of the machine, the belt 17 gradually tilts from a position parallel with belt 16, as illustrated in Figs. 4, 5, and 6, to a position at approximately 135° from its original position, folding one-half of the formed dough over on the other half to form a pocketbook or Parker House roll. As the belt 17 passes under the middle roller 26 of the belt 17 tilted at an acute angle to the belt 16, as shown in Fig. 2, the belt 17 then turning toward its original position as it moves past the succeeding roller 26 and away from the folded formed dough roll 8. The adjusting board 66, as shown in Fig. 11 may be disposed at any desired position above the belt 16 to engage the formed dough and shape it from a flat shape to a round shape, the board being curved at its forward end where it first engages the formed dough but held in adjusted position with its rear end spaced closer to the conveying belts 16 and 17, whereby the formed dough as it contacts the board will start to roll and will come out in a rounded oblong shape, whereby the apparatus automatically forms the weiner type of roll.

The qualifications of the machine are primarily for the purpose of folding and greasing, automatically the Parker House type of roll and the folding method and greasing manner of unit are the primary reasons for seeking Patent Office protection.

What we claim is:

1. In a machine for making bread rolls of the type described, the combination of an elongated table, rollers mounted at each end of the said table, a pair of parallel endless belts mounted on said rollers, motor operated means for simultaneously driving said belts, a dough forming apparatus for delivering formed dough at one end of the aforesaid belts in a position to lie across both belts, a series of spaced rollers supported at varying angles for gradually tilting one of the belts from a horizontal position to an angle of 135° (whereby to fold the formed dough over upon itself) and thereafter turn back to its former horizontal position.

2. In a machine for making bread rolls of the type described, the combination of an elongated table, rollers mounted at each end of the said table, a plurality of parallel endless belts mounted on said rollers, motor operated means for simultaneously driving said belts, a dough forming apparatus for delivering formed dough at one end of the aforesaid belts in a position to lie across both belts, a series of spaced rollers supported at varying angles for gradually tilting one of the belts from a horizontal position to an angle of 135° and back again to a horizontal position, whereby to fold the formed dough over upon itself.

WILLIAM H. ATTAWAY.
WALTER A. BECKER.